United States Patent [19]
Borrell et al.

[11] Patent Number: 5,315,538
[45] Date of Patent: May 24, 1994

[54] **SIGNAL PROCESSING INCORPORATING SIGNAL, TRACKING, ESTIMATION, AND REMOVAL PROCESSES USING A MAXIMUM *A POSTERIORI* ALGORITHM, AND SEQUENTIAL SIGNAL DETECTION**

[75] Inventors: Ronald A. Borrell, Fullerton, Calif.; Ben R. Breed, Austin, Tex.; Allen K. Lo, Diamond Bar, Calif.; Mark D. Skinas, deceased, late of Huntington Beach, both of Calif., by Kimberly A. Skinas, adminstratrix; Kenneth A. Witzke, Santa Clara, Calif.

[73] Assignee: Hughes Aircraft Company, Los Angeles, Calif.

[21] Appl. No.: 860,732

[22] Filed: Mar. 23, 1992

[51] Int. Cl.$^5$ .................. G06K 9/34; G06K 9/36; H04N 7/12
[52] U.S. Cl. .................. 364/574; 364/516
[58] Field of Search .................. 364/423, 428–430, 364/439, 516, 554, 550, 572, 574; 342/159, 160; 358/126, 336; 382/10, 14, 20, 22, 31, 9

[56] References Cited

U.S. PATENT DOCUMENTS

| | | | |
|---|---|---|---|
| 4,364,089 | 12/1982 | Woolfson | 358/126 X |
| 4,764,971 | 8/1988 | Sullivan | 364/554 X |
| 4,918,633 | 4/1990 | Sullivan | 364/574 |
| 5,058,181 | 10/1991 | Ishihara et al. | 382/22 |

Primary Examiner—Kevin J. Teska
Assistant Examiner—Edward Pipala
Attorney, Agent, or Firm—Wanda K. Denson-Low

[57] ABSTRACT

A system and method for automating signal tracking, estimation of signal parameters, and extraction of signals from sonar data to detect weaker signals. A maximum a posteriori (MAP) algorithm processing provides a track output of the signal which is used as a guide or template to provide optimal spectral integration on an unstable or frequency varying line. The present invention includes track integration, parameter estimation, signal track normalization, and sequential signal detection. The present invention partitions the input band into frequency subwindows. For each subwindow, the strongest signal is tracked, its parameters are estimated, and then the signal is normalized (removed) from the subwindow. This is repeated until the entire subwindow set is processed. Then the subwindows, now with their strongest signals removed, are recombined to form one input band. This aggregated procedure represents one processing pass. In the next pass, the entire above procedure is repeated with either the same or new subwindow boundaries. This continues until a predetermined number of passes is completed. Sequential signal detection is provided from one data frame to the next, a problem that is beyond the capability of conventional systems and methods for tracking frequency lines of unknown frequency modulation and amplitude.

11 Claims, 5 Drawing Sheets

SIGNAL PROCESSING INCORPORATING SIGNAL, TRACKING, ESTIMATION, AND REMOVAL PROCESSES USING A MAXIMUM *A POSTERIORI* ALGORITHM, AND SEQUENTIAL SIGNAL DETECTION

This invention was made with Government support under Contract No. N00039-87-C-0152 awarded by the Department of the Navy. The Government has certain rights in this invention.

BACKGROUND

The present invention relates generally to passive signal sensing and signal processing, and more particularly, to signal processing incorporating signal tracking, estimation, and removal processing using maximum a posteriori and sequential signal detection methods.

Signal processing hardware and software has improved to the point where it is very difficult, if not impossible, for sonar operators to manually detect and track all desirable signals that are available. Traditional signal detection and estimation processes are achieved by the integration of spectral bins at constant frequency over some time period T. This approach results in poor estimation of the parameters associated with signals that do not exhibit pure tonal characteristics.

Furthermore, an underlying processing assumption has been that there always exists a signal in the input data. However, this condition cannot always be guaranteed in applications in which the input data is often noise-only. To circumvent this discrepancy, in an existing maximum a posteriori (MAP) processing system developed by the assignee of the present invention, the decision regarding the presence of absence of a signal was deferred until the line linking and clustering stages. This design was conceived with the assumption that noise tracks (signal absence) would not be successfully linked and clustered and therefore would eventually be purged, thereby effectively accomplishing the desired signal detection. Unfortunately, this preconception has proven to be incorrect by computer simulations which showed noise tracks were often erroneously linked to existing signal tracks due to the likeness of their signal features.

This result has led to the conclusion that eliminating noise tracks at the MAP output is a necessary processing step for achieving an acceptable performance. This means that the MAP processing must be extended beyond its original capabilities to include signal detection logic in its procedure. To achieve this, the MAP output must be statistically characterize under noise-only and signal-plus-noise conditions.

For signal detection applications, very little was previously known about the MAP algorithm in terms of its quantitative performance, such as minimum detectable signal-to-noise ratio (SNR), probability of detection (pd). probability of false alarm (pfa), and performance sensitivity to input spectral statistics. This has caused problems in selecting correct thresholds to yield desired detection performance.

SUMMARY OF THE INVENTION

The objective of one aspect of the present invention is to provide a system and method for automating signal tracking, estimating of signal parameters, and extraction of signals from sonar data to allow further processing of the data for the detection of weaker signals. This processing is based upon the maximum a posteriori (MAP) algorithm by Short and Toomey that is described in "Detection and Estimation of Frequency Random Signals", *IEEE Transactions on Information Theory*, Vol. IT-28, No. 6, November 1982. One aspect of the present system and method improves the conventional processing capability by including track integration, parameter estimation, and signal track normalization.

What has been done in the present invention is to improve the existing process by combining the Short and Toomey MAP processing with considerable additional processing logic. The MAP processing provides a track output of the signal which is used as a guide or template to provide optimal spectral integration on an unstable or frequency varying line. This one aspect of the present invention has adapted the MAP processing to the task of signal tracking, estimation, and removal. Processing in accordance with this aspect of the present invention comprises the following.

(1) The present system and method partitions the input band into frequency subwindows (sub-bands). For each subwindow, the strongest signal is tracked, its parameters are estimated, and then the signal is normalized (removed) from the subwindow. This is repeated until the entire subwindow set (input band) is processed. Then the subwindows, now with their strongest signals removed, are recombined to form another input band. This aggregated procedure represents one processing pass. In the next pass, the entire procedure is repeated with either the same or new subwindow boundaries. This continues until the predetermined number of passes is completed.

(2) The normalization (removal) of detected signal is accomplished by using the inverse of an acoustic line integrand, a signal bandwidth estimation, and a signal track. After the signal is normalized in the current subwindow, it is later recombined to form an input band for further processing to support (1) above.

(3) Acoustic line integration produces an acoustic line integrand using the signal track as a time varying frequency guide while integrating in time a specified spectral width. It is used for parameter estimation and signal normalization in (2) above.

(4) Two bandwidths are calculated with the present method. These include a 3 dB bandwidth, and a signal normalization bandwidth for parameter estimation and signal track normalization, respectively. The present system and method uses two parabolas (left and right) to insure a good bandwidth estimate for signals with skewed (nonsymmetric) spectral densities.

Furthermore, the present invention provides for a system and method that adapts the MAP processing to sequential detection, a problem that is beyond the capability scope of the Short and Toomey algorithm for tracking frequency lines of unknown frequency modulation and amplitude. The Short and Toomey MAP algorithm, in its original form, always yields a solution track even if the input data contains no signal; in which case, the solution represents a meansingless noise track. An additional aspect of the present invention is to augment the capability of the MAP algorithm with a procedure that makes a decision, as in a classical signal detector, as to whether the observable solution track (or a function thereof) contains signal or noise-only data. In addition, for the purpose of detecting weak signals, the present procedure also includes "no decision" as an alternative in order to allow signal energy to build-up over consecutive time periods to provide for sequential detection.

The purpose of this aspect of the present invention is to decrease the processing load subsequent to the signal detection stage. By shifting the erroneous detection elimination process to the signal detector, the load on the signal track time-linking and track management functions is decreased, which provides for processing of a higher volume of valid detections.

This improvement provides an additional system flexibility over the conventional system where detection was performed on each time segment of data and the track is classified either as signal or noise. This detection methodology inherently produces a large number of false alarms, rather than risk a missed detection. The rationale behind this is that false detections can be removed by subsequent signal processing, whereas if the detection threshold is set sufficiently high to eliminate a good portion of the false detections (noise tracks) at the detector output, low level signal might be lost with no possibility of recovery. The present invention provides the best of both situations, and the system and method either eliminates false alarms and passes valid detections at the detector output, or if no decision is currently possible, the detector outputs are accumulated until a decision can be made. In essence, at each time segment, three possible outcomes are present: detection, no detection, or no decision.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

By way of introduction, the Short and Toomey algorithm is a multi-dimensional maximization search process that always yields a track of energy, among all other possible tracks of energy, as its global solution in the frequency-time space. This algorithm, however, can only find one solution per application. Furthermore, it contains no intelligence or logic to distinguish whether the arrived solution represents a genuine signal track or just a sequence of sporadic noise energy. On the other hand, signal processing using this algorithm has been demonstrated to yield superior performance over other known algorithms in tracking a wide variety signals having different frequency dynamics. The present signal detection system and method makes use of the Short and Toomey algorithm in a signal tracking environment, and augments it with additional processes and logic to overcome its limitations. The processing steps involved in the present signal detection method is described as follows.

Figure 1:
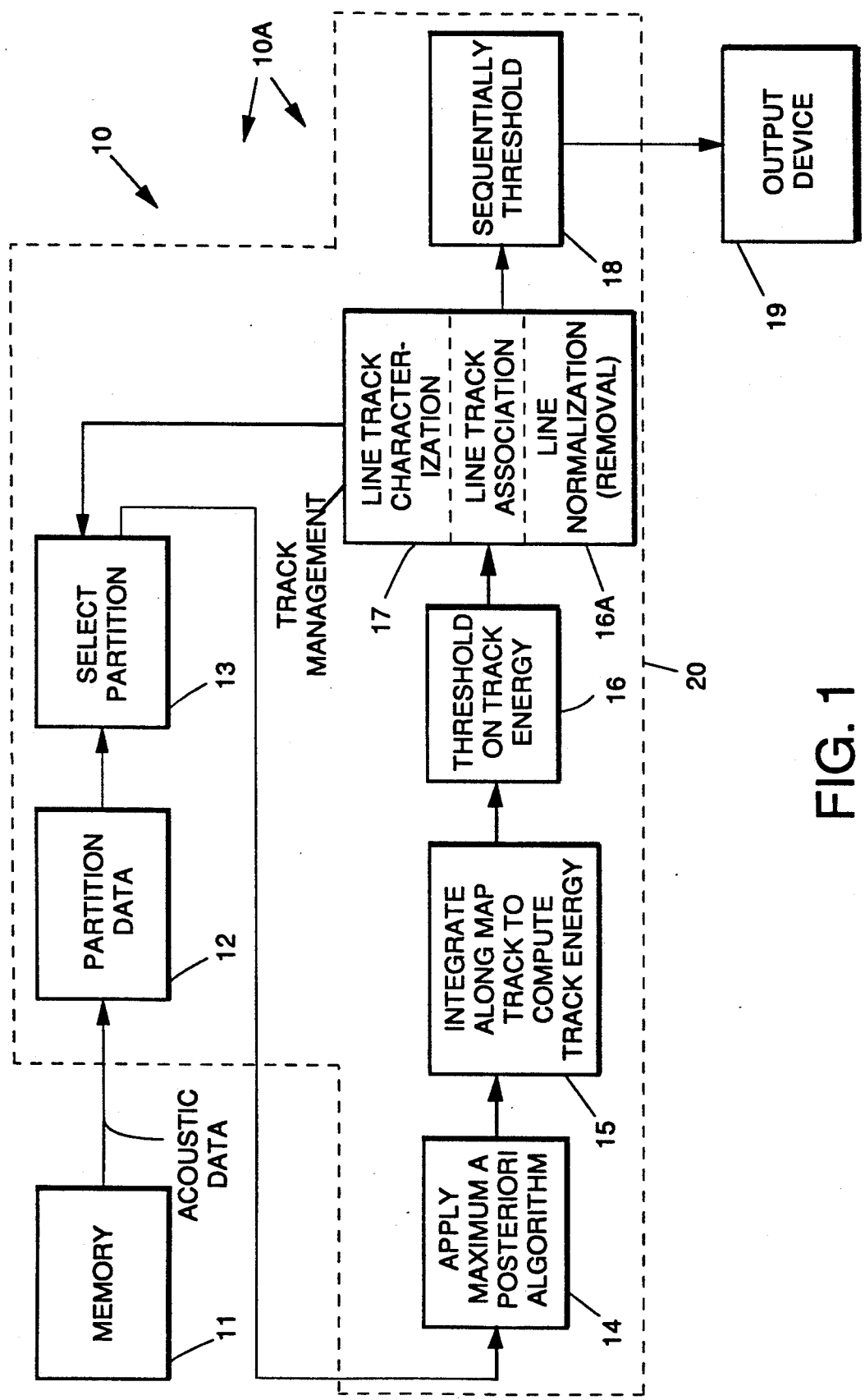
FIG. 1 is a block diagram illustrative of a system and method in accordance with the principles of the present invention that includes partitioning, signal tracking, signal estimation, signal removal, track management, and sequential signal detection procedures.

Referring to the drawing figures, FIG. 1 is a block diagram of a processing system 10 and method 10A in accordance with the principles of the present invention that includes partitioning 12, 13, signal tracking 14, signal estimation 15, threshold on track energy 16, signal removal 16A, track management 17, and sequential signal detection 18 procedures. The system includes a memory 11, a signal processing computer 20, and an output device 19, such as a sonar display. The memory 11 and output device 19 are coupled to the signal processing computer 20 in a conventional manner. The method 10A of the present may be implemented as a program that runs on the computer 20, or may be fabricated as a custom integrated circuit to form part of the system 10 that incorporates the logic of the computer program. The method 10A will be described in more detail with respect to FIGS. 2-11 below.

Figure 2:
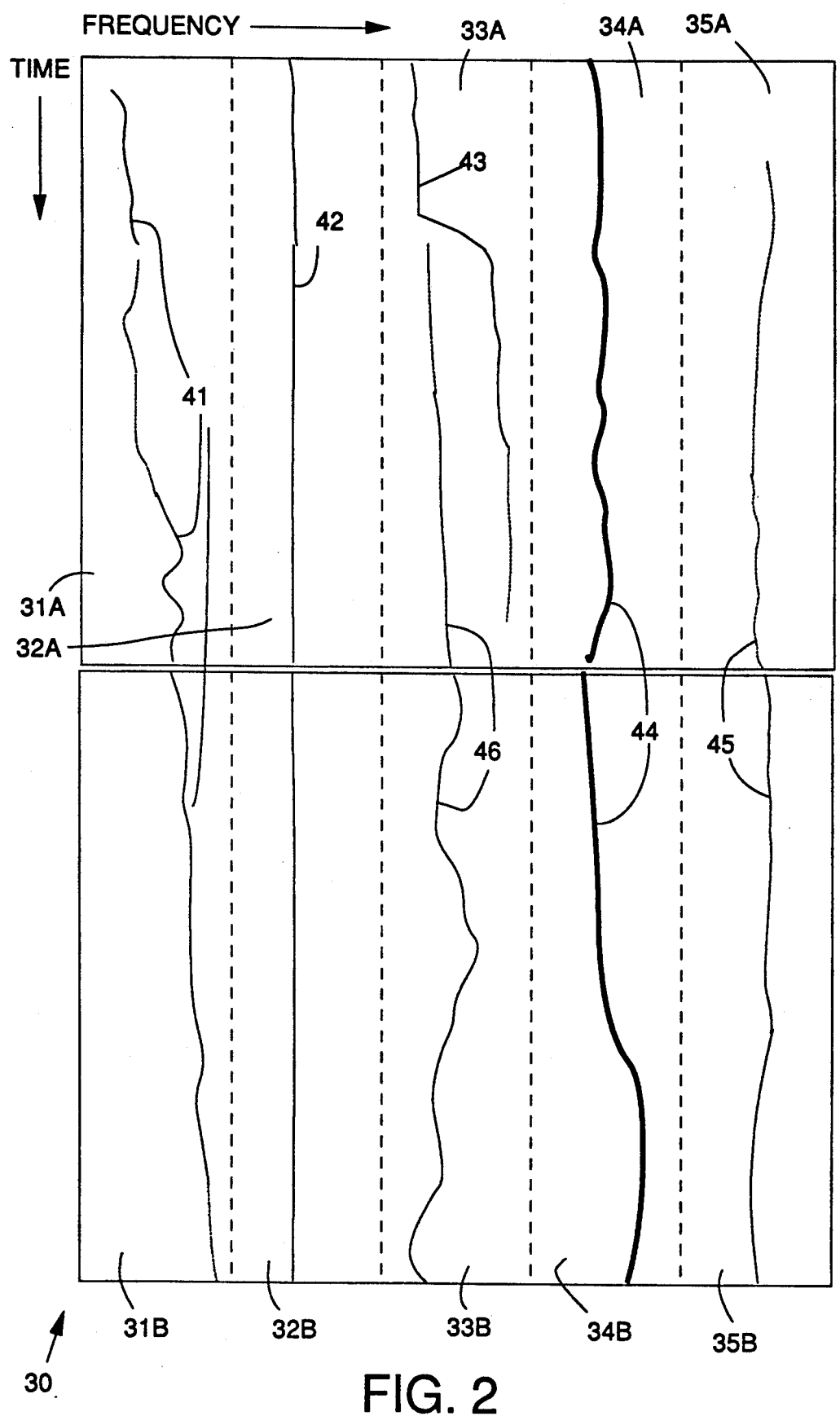
FIG. 2 shows data useful in explaining the system and method of FIG. 1.

FIG. 2 shows displayed data 30 from two successive frames useful in explaining the system 10 and method 10A of FIG. 1. The data shown in FIG. 2 is partitioned, as is illustrated by the dashed vertical lines. Five partitions from each of two successive display screens 31A, 32A, 33A, 34A, 35A, 31B, 32B, 33B, 34B, 35B are shown that have a variety of possible target signals 41, 42, 43, 44, 45, 46, and 47 therein. It is to be understood that any number of partitions may be employed and the number of partitions is selected at the discretion of the operator such that optimum processing throughput is achieved. The present system 10 and method 10A is adapted to detect all signals that are illustrated in FIG. 2, whereas conventional processors employing time-integration are only able to detect signal 42 because it is the only signal in the data 30 which has stable signal strength and frequency.

On the other hand, target detection systems and methods employing the Short and Toomey algorithm would only detect the strongest signal (signal 44 illustrated as a darker line and hence a stronger signal) out of all of the signals shown. More importantly, signals 41, 43, 45 and 46 are not detectable by detection systems employing either the conventional time-integration or unaugmented Short and Toomey algorithm.

The present system 10 and method 10A operates as follows, the data is partitioned 12 and the first partition 31A is selected 13. The Short and Toomey algorithm is applied to the data 30 and produces the first track 41. The two disjointed sections of the track 41 are integrated to produce the track 41. The total energy of the track 41 is determined and is thresholded with reference to two thresholds. A lower threshold is indicative of an energy below which is considered noise, and an upper thresholds indicative of an energy that is a target. The energy band between the two thresholds contains possible targets, and the present invention optimizes the selection of the threshold levels and adjusts them while maintaining a constant false alarm rate in order to detect all potential targets contained in the data. This will be discussed in more detail below.

After integrating and thresholding the track energy, the present system 10 and method 10A computes a variety of track line characteristics, including two frequency bandwidths, signal-to-noise ratio and frequency rate, which allows the present invention to perform a line association procedure that permits the time-linking or association of the detected signal tracks 41, 42, 44, 45 and 46, in the partitions 31A to 35A to the detected signal tracks 41, 42, 44, 45 and 46, in the partitions 31B to 35B. This will be described in more detail below. Basically, by computing various signal parameters associated with each signal track, the present invention is capable of linking data from one frame to the next, thus providing the ability to detect and track targets continuously from frame to frame.

Figure 6:
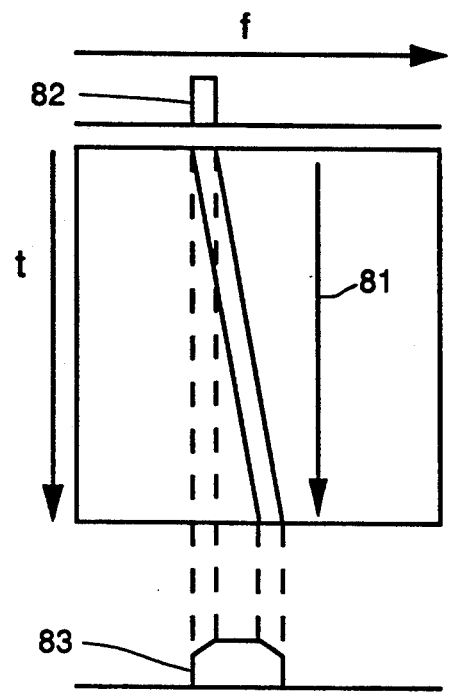
FIG. 6 illustrates a conventional integration method.
Figure 7:
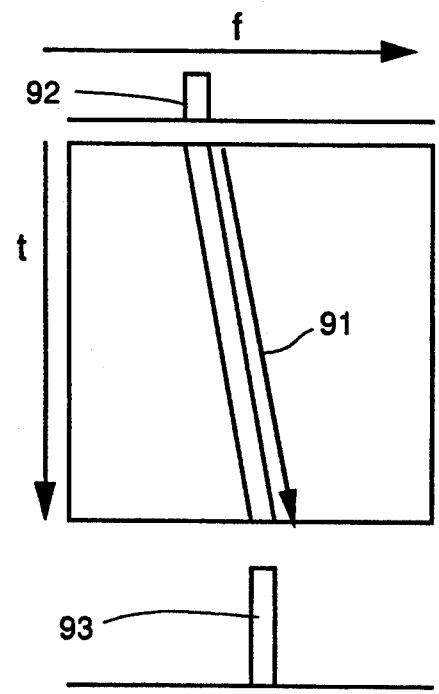
FIG. 7 illustrates an integration method in accordance with the invention.
Figure 11:
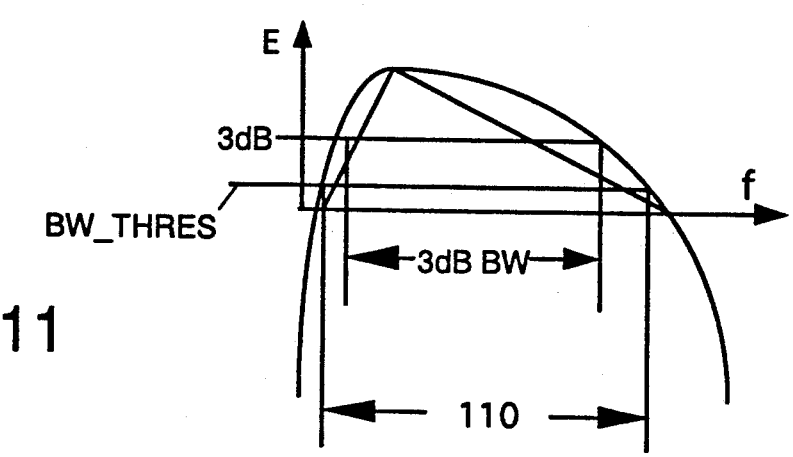
FIG. 11 shows a bandwidth measurement method in accordance with the invention.

The signal tracking portion of the present invention is provided by the Short and Toomey processing algorithm (MAP algorithm 14a) that provides a track output signal 91 that is used as a guide or template to provide optimal spectral integration of a unstable or frequency varying track output signal 93 shown in FIG. 7, whereas FIG. 6 demonstrates the spectral energy smearing effect 83 caused by the conventional time-integration method. The resultant integrand from signal tracking MAP algorithm 14a provides a superior estimate of the signal's spectral density 81. With the above integrand (an acoustic line integrand) a bandwidth estimate (part of the line characteristics portion of the track management function 17) is performed that fits a separate parabola to each side of the integrand (FIG. 11). A 3 dB bandwidth is also computed for signal tracking characteristics and a predetermined signal bandwidth to ensure normalization of all bins containing signal energy.

Figure 4:
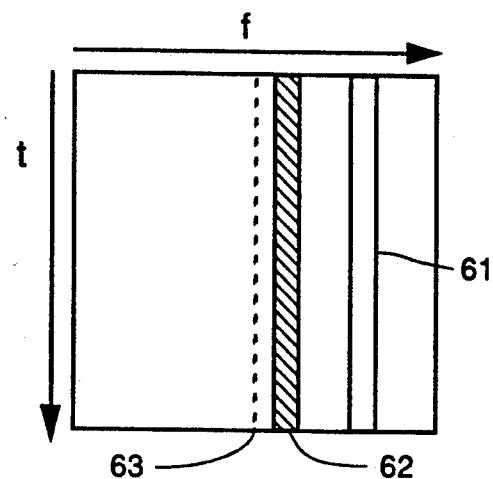
Figure 5:
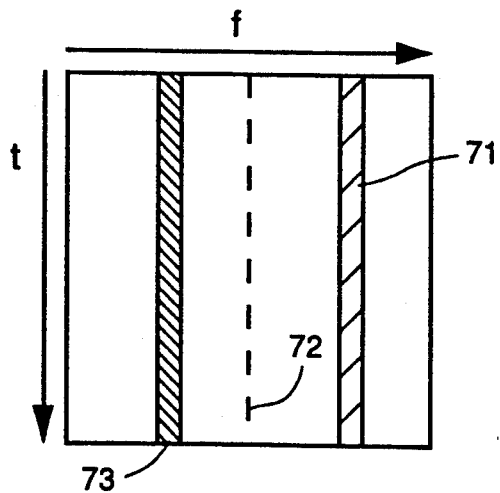
FIG. 5 illustrates multiple window detection in accordance with the invention.

Because the input frequency band is subwindowed to provide isolation between multiple signals, a single application of the Short and Toomey algorithm to the partitions 31A-35A allows tracking of signals 41, 42, 43, 44 and 45. Otherwise, only signal 44 would have been detected without the isolation to the partitions since the Short and Toomey algorithm detects only the strongest signal in the data set. Therefore, this subwindow processing provides for multiple signal detection and tracking, one for each subwindow, for each application of the MAP algorithm 14a thereby dramatically increasing processing efficiency. FIG. 5 illustrates another example of this concept in which the subwindow boundary 72 provides isolation to the partitions as such that both the high signal-to-noise ratio signal 71 and the low signal-to-noise ratio 13 are detected and tracked simultaneously with one application of the MAP algorithm 14a. In the situation where the subwindow boundary 53, 63 does not provide isolation to the signals (FIGS. 3 and 4), the line normalizing 61 of detected signals and the re-application of the MAP algorithm 14a allow successive detections of multiple signals of descending magnitudes.

Next, the signal track detected by the MAP algorithm 14a is used to provide signal parameter estimates. The parameter estimates include frequency, frequency rate, frequency minimum, frequency maximum, frequency stability, a signal bandwidth estimate (two parabola bandwidth curve fit, one for the signal 3 dB bandwidth and one for the signal track normalization bandwidth). The purpose for the signal parameter estimation is, asides from target classification, to provides signal track features on which the linking or association logic of signal tracks from one time segment to signal tracks from another time segment are based. After a signal has been detected, tracked and estimated, signal normalization or removal is performed on the region occupied by the signal. After all subwindows are processed, the procedure is repeated with another pass, optionally staggering the subwindow boundaries to extract any signal that straddled a previous subwindow boundary. Finally, the whole processes is repeated with a new time segment of data.

In order to implement the present invention, the characteristics and performance of the MAP algorithm 14a as a signal detection algorithm have been quantitatively investigated so that detection thresholds can be selected systematically in order to yield predictable results. Appendices A and B provide a detailed description of the implementation details of the present invention in which the statistics of the MAP output are characterized, including derivations of the models for pd and pdf.

Figure 3:
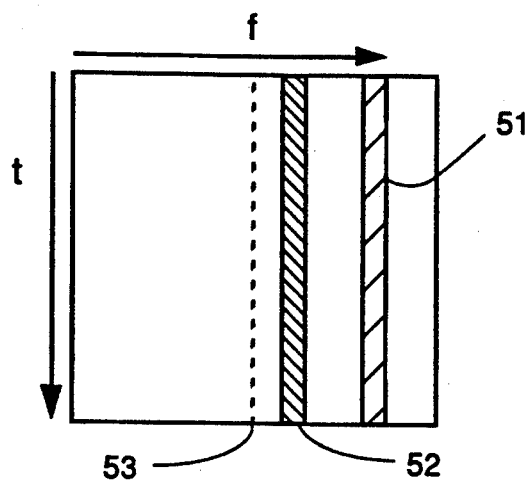
FIGS. 3 and 4 shows multiple pass detection in accordance with the invention.

The following information provides performance measures and test results wherein multiple passes, multiple subwindows, and signal normalization are employed to track high and low signal-to-noise ratio signals. In FIGS. 3-5, subwindow boundaries 53, 63, 72 are indicated by dashed lines, high signal-to-noise ratio signals 51, 71 are indicated by solid lines, low signal-to-noise ratio signal 52, 73 are indicated by gray lines, and normalized signals are 61 indicated by white bordered in black.

Multiple pass detection and signal normalization of high and low signal-to-noise ratio signals is as follows. In pass 1, high and low signal-to-noise ratio signals occurring within the same subwindow are processed. The present processing method first tracks, estimates, and removes a high signal-to-noise ratio signal. After the first pass where the high signal-to-noise ratio signal 51 has been removed, the present processing method repeats the process of tracking, estimating and removing the low signal-to-noise ratio signal 52. In FIG. 5, since the high and the low signal-to-noise ratio signals are separated by subwindowing 72, the detecting and tracking of the two signal are accomplished in one pass.

The traditional method of integration, as shown in FIG. 6, of spectral bins results in distortion, smearing of the energy over adjacent bins for a frequency varying signal. This smearing over adjacent bins reduces the peak energy and therefore lowers the detection probability of the signal. Consequently, the output integrand 83 of the input signal spectral density 82 is distorted by the integration process.

The processing in accordance with the present method improves the traditional method by using the track output of the MAP algorithm 14a as a guide or template for integration of the spectral bins. Consequently, using the present invention, the output integrand 93 of the input signal spectral density 92 is undistorted by the integration process 91 resulting in a gain in amplitude only and improved detection probability.

Figure 8:
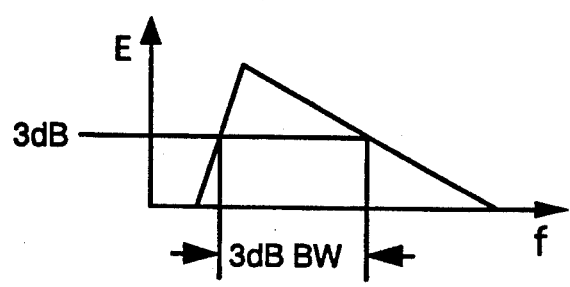
FIGS. 8-10 illustrate three conventional bandwidth measurement methods.
Figure 9:
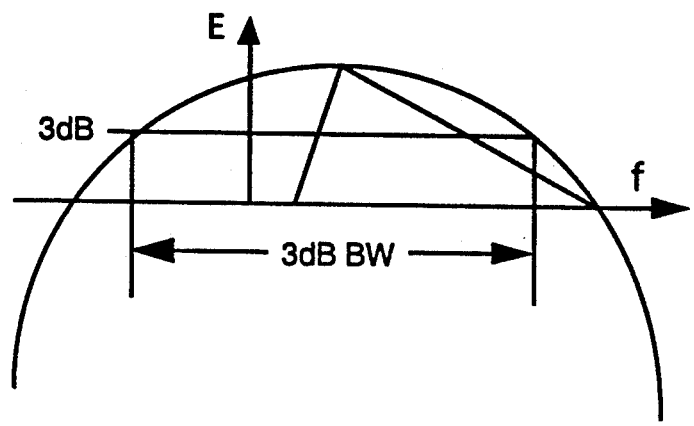
Figure 10:
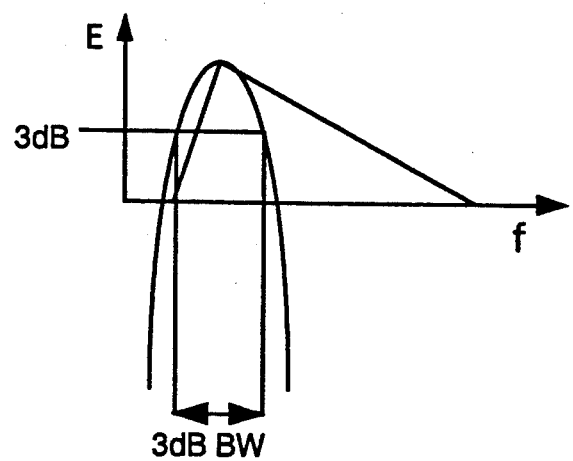

Improved bandwidth estimation is achieved by the present method as is explained below. For reference, three conventional bandwidth measurements are shown in FIGS. 8-10. FIG. 8 shows a first conventional method wherein the bandwidth is defined as a 3 dB down point on the spectral density. FIG. 9 shows a second conventional method wherein the bandwidth is defined as the 3 dB down point on a parabola fitted to the peak and the furthest x intercept point the spectral density. FIG. 10 shows a third conventional method wherein the bandwidth is defined as the 3 dB down point on a parabola fitted to the peak and the closest x intercept point the spectral density.

Bandwidth estimation in accordance with the present method is shown in FIG. 11. The signal parameter estimation bandwidth is define as the 3 dB down point on a two parabola fit. Signal normalization bandwidth 110 edges are defined by the adaptation parameter BW—

THRES. One parabola is fitted to the peak and the right x intercept point of the spectral density and the other parabola is fitted to the peak and the left x intercept point of the spectral density.

One of the most significant finding resulting from the models (see Appendix B) is that in most cases of interest such as in the noise-only and moderate to high signal-to-noise ratio conditions, the resulting pdf's (Probability Density Functions) of the underlying statistics of the MAP generated track integrands, on which signal detection decision are based, exhibit Gaussian-like characteristics. With the results from simulations, the detection performance, i.e. the pd and the pfa, can be determined for a given threshold. Conversely, for a given pfa requirement as in a constant false alarm detector, the appropriate threshold and the corresponding pd's for various signal-to-noise ratio can also be obtained.

The sequential signal detection process 18 provides for improvement of the detection performance of the present system 10 and method 10A with multiple observations (input samples). The purpose of this sequential detection process is to improve detection probability of low signal-to-noise ratio signal which had been tracked by the MAP processing method and successful associated with tracked signals of previous time segment, but do not contain sufficient energy to cross the signal detection threshold. The sequential signal detection process 18 yields, with proper control of thresholds, a desired detection performance level of the system 10 and method 10A of the present invention independent of the number of input observations.

In general, a procedure for testing a binary hypothesis ($H_1$ or $H_0$) for a sequential detector is as follows. For a given observation, one of the three decisions is made. These decisions are deciding $H_1$, or deciding $H_0$, or deferring decision until the next observation. Thus, a decision is made sequentially at every observation epoch. If either one of the first two decisions is made during any observation, the process terminates; otherwise, the process continues to accept another observation. As for the present invention, the sequential scheme is only applied to the initial detections where new signal tracks are formed. Once the decision is made on the new signal track in regard to its status, the sequential detector procedure terminates. The termination of this procedure, however, does not preclude further tracking or extension of the signal track. A detailed testing procedure for the sequential signal detection process 18 is presented in Appendix C. A mathematical description of the sequential signal detection process 18 in accordance with the present invention is described in Appendix D. The pseudo code for the sequential signal detection process 18 is provided in Appendix E.

In summary, it has been successfully demonstrated using the system 10 and method 10A of the present invention that the Short and Toomey MAP algorithm 14a can be extended as a signal detector in addition to its normal estimation applications. Accordingly, performance has been enhanced by eliminating unwanted noise tracks earlier in the process so that these noise tracks do not overload and cause erroneous line linking and clustering in the downstream track management function. In achieving this, models have been developed from which the conditional pdf's, as in binary detectors, of the signal-plus-noise and noise-only MAP outputs are characterized. A significant conclusion is that these pdf's exhibit Gaussian-like characteristics for most signal-to-noise ratios of interest.

Thus there has been described a new and improved system and method that provides for improved target signal tracking using improved signal tracking, estimation, and removal techniques employing maximum a posteriori processing algorithm and sequential signal detection. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

APPENDIX A

The details of the signal processing method 10A of the present invention are as follows. First, the input frequency band is divided into frequency subwindows (partitions 31A-35A). This is accomplished by partitioning the input frequency band into frequency subwindows for the current processing pass. Since the MAP algorithm 14aa tracks the strongest signal, partitioning provides a method for detecting low signal to noise ratio targets by isolating them from stronger neighbors. The partitioned subwindow of data is the input to the signal tracking 11 portion of the method 10A. The partitioning is achieved using the following procedure:

```
for t = 1, T
    for subwindow_width = 1, SUBWINDOW_WIDTH(npass)
        index = subwindow_width + SUBWINDOW_START
        (nsubwindow,npass)
        X(t, subwindow_width) = INPUT_BAND(t,index)
    endfor
endfor
F = SUBWINDOW_WIDTH(npass).
```

The details of the Short and Toomey MAP algorithm 14aa are as follows. The MAP algorithm 14aa is a procedure to select a track in a time series of digital Fourier transform (DFT) outputs which maximizes the a posteriori probability. Each possible track is associated with a scalar track quality number. The maximum value of track quality is associated with an output MAP track. Thus, each MAP track and its related track quality are functionally dependent on the input data and the set of prior transition probabilities. The transition probabilities are probabilities that favor the detection of an operator-specified signal type and rejects all others. The input to the MAP algorithm 14a is the spectral magnitude data contained in X(t,f), a subwindow of data extracted form the input band. An intermediate result is contained in a transition probability index vector Y(t,f). From this intermediate result, a search is made for a global maximum. The global maximum is used as a starting point to trace back using the index vector as an indicator for transitioning back in time through the data to determine the maximum track, TRK(t).

The specific algorithm used in the present MAP algorithm 14a is:

$$Y(t,f) = X(t,f) + \text{Max}\{Y(t-1, f+n.p)\log[P(np)]\}, p1 \leq np \leq p2$$

Y(t,f): MAP cost function at time bin t and frequency bin f.

X(t,f): spectral bin amplitude magnitude at time bin t and frequency bin f.

P(np): transition probability from frequency bin f+p1 to f+p2.

TRK(t): Frequency track of signal as function of time.

T: time segment length in bins.

F: frequency width in bins.

X(t,f): spectral bin amplitude magnitude at time bin t and frequency bin f.

TRK(t): Frequency track of signal as function of time.

ALI(-ALI_WIDTH:ALI_WIDTH)

The pseudo code that is representative of the processing method of the present invention is:

```
Initialize frequency bin for time bin = 1.
    for f = 1, F
        temp2(f) = X(1,f)
    endfor
save old cost vector
    for f = 2,T
        for f = 1,F
            temp1(f) = temp2(f)
        endfor
        for f = 1,F
initialize index array to zero, max to largest negative number
            y(t-1, f) = 0
            max = MAX_NEG
loop through transitional probabilities
            for np = -NP,NP
compute index
                index = f + np
check bounds
                if((index ≥ 1) .and. (index ≤ F)) then
form temporary cost vector
                    temp2(f) = temp1(index + P(np))
test cost vector against max
                    if( temp2(f) > max) then
update max
                        max = temp2(f)
update index
                        y(t-1, f) = np
                    endif
                endif
            endfor
construct new cost vector
            temp2(f) = max + x(t,f)
        endfor
initialize max to largest negative number max = MAX_NEG
        for f = 1,F
test for global minimum
            if(temp2(f) > max) then
                imax = f
                max = temp2(f)
            endif
        endfor
initialize track to global max bin
        TRK(T) = imax
decrement through time
        for t = T, 2, -1
form track from index array
            TRK(t-1) = TRK(t) + y(TRK(t),t-1)
        endfor.
```

The acoustic line integration portion of the present method 10A computes the sum of frequency bins centered around the MAP frequency track for one time segment. The resultant integrand is contain in ALI(-ALI_WIDTH:ALI_WIDTH), where ALI_WIDTH is a preselected integration width. This integrand is used in subsequent processing as will be described below. The steps of this computation are:

for $ali = -ALI\_WIDTH, ALI\_WIDTH$ $$ALI(ali) = \sum_{t=1}^{T} X(t, ali + TRK(t))$$

endfor.

Parameter estimation is accomplished using three sets of data: (1) the spectral magnitude subwindow data, X(t,f); (2) the Acoustic Line Integrand, ALI(ali); and (3) the track output of the MAP algorithm 14a, TRK(t).

Signal detection is performed as follows. The center bin in the ALI integrand ALI(0) contains the accumulated acoustic energy along the signal track. The integrated energy in the center bin, ALI(0), corresponds to an observed measurement output from the MAP algorithm 14a, operating on acoustic spectral magnitude data, X(t,f). The signal track energy, ALI(0), is a random variable (and has a different density function than the input due to the nonlinearity of the MAP algorithm 14a) by the virtue of its corresponding random input. The input data, X(t,f), contains either signal plus noise, or noise. A test is made against a detection threshold to determine the presence or absence of a signal before any further processing is performed. The method for determining the value for this threshold may be found in A. Papoulis, "Probability, Random Variables, and Stochastic Processes", New York: McGraw-Hill, 1965. Detection is made using the following equations.

ALI(0)>Detection Threshold; Signal+Noise; detection_flag=true

ALI(0)<Detection Threshold; Noise; detection_flag=false.

The bandwidth estimate is made as follows. With no prior knowledge, a nonsymmetrical signal is assumed in the bandwidth estimate in order to provide a more accurate estimate. This requires fitting two parabolas to the acoustic line integrand, one for the left hand side, and one for the right hand side. The parabola maximums are joined at a common point at ALI(0).

The left handed bandwidth is obtained as follows. The peak of the acoustic line integrand, ALI(0), is used as the starting point in the search for the signal bandwidth left edge. All search parameter are initialized to zero: min, the current minimum acoustic line integrand value (spectral magnitude); left_bin, the current frequency bin associated with the min variable; minfind, the indicator preventing further updating of an adaptation parameter PEAK_2_FACTOR, prevents premature bandwidth edge detection due to perturbations in the acoustic line integrand, ALI(ali). The specific procedural steps are as follows. Define

```
min = ALI(0)
    left_bin = 0
    minfind = 0
Then,
    for ali = -1, (1-ALI_WIDTH), -1
        if(minfind = 0)
            if { (ALI(ali) > Bandwidth threshold) and
                 (ALI(ali) ≤ PEAK_2_FACTOR*min) }
                if (ALI(ali) ≤ min) then
                    min = ALI(ali)
                    left_bin = ali
                endif
            else
                minfind=1
            endif
        endif
```

-continued
```
        endfor
```

The right handed bandwidth is obtained as follows. The description is identical to the left handed bandwidth, substituting right for left. Define

```
        min = ALI(0)
        right_bin = 0
        minfind = 0
Then,
    for ali = 1, (ALI_WIDTH - 1)
        if(minfind = 0)
            if { (ALI(ali) > Bandwidth Threshold) and
                (ALI(ali ≦ PEAK_2_FACTOR*min) }
                if (ALI(ali) ≦ min) then
                    min = ALI(ali)
                    right_bin = ali
                endif
            else
                minfind = 1
            endif
        endif
    endfor
```

Left bandwidth bin interpolation is performed as follows. In order to provide a more accurate estimate, one frequency bin beyond the initial search above is tested. If a lower energy is found is this new bin, an interpolation is made between the two bins. If the energy is higher, a parabola fit is performed with the original bin and bin energy using the following procedure.

```
ali_left = ALI(left_bin)
    if (ALI(left_bin - 1) ≦ ALI(left_bin)) then
        ali_left = (ali_left + ALI(left_bin - 1))/2
        left_bin = left_bin - 0.5
    endif
```

The right bandwidth bin interpolation is performed as follows, and is identical to left bandwidth interpolation above.

```
ali_right = ALI(right_bin)
    if (ALI(right_bin + 1) < ALI(right_bin)) then
        ali_right = (ali_right + ALI(right_bin + 1))/2
        right_bin = right_bin + 0.5
    endif
```

A two parabola-left and right curve fit and 3 dB bandwidth estimation is performed as follows. For the right handed bandwidth assume a parabola of the form $$y = ax^2 + b.$$

Set $b = ALI(0)$, the maximum of the parabola at the peak of the acoustic line integrand.

$$y = ax^2 + ALI(0).$$

Next solve for a, where $$a = (y - ALI(0))/x^2$$

From the right bandwidth bin interpolation above, $y = ali\_right$, for $x = right\_bin$, and $$a = (ali\_right - ALI(0))/(right\_bin)^2.$$

Substituting in for a and b and solving the parabola equation for x yields $x = $ square root$(y - ALI(0))(right\_bin)^2/(ali\_right - ALI(0)))$.

The 3 db bandwidth calculation is made as follows. The signal parameter bandwidth used to added in tracking and classifying a signal. The 3 dB point is defined as $y = 0.5*ALI(0)$, the half power point. Substituting in the equation for x above, $x_{3dB}$(right hand) $= \{(0.5*ALI(0) - ALI(0))(right\_bin)^2/(ali\_right - ALI(0))\}^{\frac{1}{2}}$.

Simplifying, $x_{3dB}$(right hand) $= \{(ALI(0)*right\_bin*right\_bin)/[2*(ALI(0) - ali\_right)]\}^{\frac{1}{2}}$.

Similarly for the left hand parabola, $x_{3dB}$(left hand) $= \{(ALI(0)*left\_bin*left\_bin)/[2*(ALI(0) - ali\_left)]\}^{\frac{1}{2}}$.

The 3 dB bandwidth is the sum of the left hand and right hand 3 dB bandwidths above:

bandwidth $= \{(ALI(0)*left\_bin*left\_bin)/[2*(ALI(0) - ali\_left)]\}^{\frac{1}{2}} + \{(ALI(0)*right\_bin*right\_bin)/[2*(ALI(0) - ali\_right)]\}^{\frac{1}{2}}$.

The signal normalization bandwidth edge calculation is made as follows. This signal bandwidth estimate is used in determine the extent the region for performing signal track normalization. The signal edge point is an adaptation parameter BW_THRES. A typical value for BW_THRES during testing was 1.15, which is equal to the noise level plus 15%.

$y = $ BW_THRES.

Substituting in the equation for x, $x_{signal\_edge}$(right hand) $= \{(BW\_THRES - ALI(0))(right\_bin)^2/(ali\_right - ALI(0))\}^{\frac{1}{2}}$.

Similarly for the left hand parabola, $x_{signal\_edge}$(left hand) $= \{(BW\_THRES - ALI(0))(left\_bin)^2/(ali\_left - ALI(0))\}^{\frac{1}{2}}$.

The computation for the frequency estimate computes the average frequency (expressed in bins) of detected signal tracks using the MAP track output, TRK(t), and the number of time bins in the track, T. This frequency estimate is defined by:

$$\text{frequency} = 1/T \sum_{t=1}^{T} TRK(t).$$

The computation for the frequency rate estimate (expressed in bins) of detected signal tracks are determined by the slope of a straight line fitted to the signal track, which represents the best fit in an RMS sense. The method is given below. The frequency rate is defined by the equation:

$$\text{frequency rate} = \sum_{t=1}^{T} C2(t)*TRK(t),$$

where C2(t) is time bin t of the vector C2, as follows $$\begin{bmatrix} C1 \\ C2 \end{bmatrix} = (H^T H)^{-1} H^T, H = \begin{bmatrix} 1 & 1 \\ 1 & 2 \\ \cdot & \cdot \\ \cdot & \cdot \\ \cdot & \cdot \\ 1 & T \end{bmatrix}.$$

The frequency minimum is defined as the minimum frequency bin of the signal track. Similarly, the frequency maximum is defined as the maximum frequency bin of the signal track. These values are determined as follows.

```
for t = 1,T
    if( TRK(t) < frequency minimum) then
        frequency_minimum = TRK(t)
    if ( TRK(t) > frequency maximum) then
        frequency_maximum = TRK(t)
endfor.
```

The stability of a signal track is defined as the difference between the frequency maximum and the frequency minimum plus one (expressed in bins), and is computed using the equation:

stability = frequency_maximum − frequency_minimum + 1.

The signal to noise ratio estimate is made as follows. If the MAP track is assumed to contain a signal, then ALI(0) is given by:

ALI(0) = (signal + noise)*T, and the signal to noise ratio is defined by:

signal_to_noise_ratio = signal/noise = (signal*T)/(noise*T) = (signal*T + noise*T)/(noise*T) −− (noise*T)/(noise*T), and accordingly, signal_to_noise_ratio = ALI(0)/(noise*T) − 1.

Assuming that the input acoustic data X(t,f) has been spectrally normalized, the noise estimate is assumed to equal to unity. With this, the denominator is simply T, the number of time bins multiplied by unity. The signal to noise ratio is given by:

signal_to_noise_ratio = ALI(0)/T − 1.

The signal removal function is adapted to remove a signal once it is detected. Once a track has been found, the track is removed from the observed data so that it does not interfere with the detection of any remaining tracks. This is achieved in the following manner.

The normalization vector calculation is accomplished by setting signal_normalizer (−ALI_WIDTH, ALI_WIDTH) equal to the inverted acoustic line integrand, ALI(−ALI_WIDTH, ALI_WIDTH) and multiplying by the number of time bins in the segment, T, as follows.

```
for ali = −ALI_WIDTH, ALI_WIDTH
    signal_normalizer(ali) = T/ALI(ali)
endfor.
```

In order to normalize the signal, the track, TRK(t) is used as an index for applying a signal normalizer to the subwindowed spectral magnitude data, x(t,f).

```
lb = x_signal_edge(left hand)
rb = x_signal_edge(right hand)
for t=1,T
    for trk=TRK(t) − lb, TRK(t) + rb
        X(t, trk) = X(t, trk)* signal_normalizer(trk − TRK(t))
    endfor
endfor.
```

The signal normalized subwindow is inserted into the input band for further processing. After the signal track is normalized within its subwindow in the procedure above, that subwindow is reinserted into the input band. After insertion, the input band may be further processed by partitioning the input band into new subwindows in the frequency subwindows procedure at the beginning of the loop. This is achieved by the procedure:

```
for t=1, T
    for subwindow_width = 1, SUBWINDOW_WIDTH(npass)
        index = subwindow_width +
            SUBWINDOW_START(nsubwindow,npass)
        INPUT_BAND(t,index) = X(t, subwindow_width)
    endfor
endfor.
```

APPENDIX B

The following is provided to better understand the processing performed in the present invention. The input to the MAP algorithm 14a is a segment of acoustic data of N time bins in length and K frequency bins in width. In processing using the Short and Toomey algorithm, a MAP cost function, one for each frequency bin of the acoustic data is then computed recursively in time in accordance with equation (1).

$$Y(N_k) = X(N_k) + \text{Max}_{j=1,0,1}\{\log[p(n_k|n-1_{k-j})]\} \quad (1)$$

for n=2, ... ,N; initialize $Y(N_k) = X(N_k)$; k=1, ... ,K; and set R(n,k)=j, where $Y(N_k)$ is the MAP cost function at time bin n and frequency bin k, $X(N_k)$ is the spectral bin magnitude at time bin n and frequency bin k, $p(n_k|n-1_{k-j})$ is the transitional probability from bin $n-1k-j$ to bin kn, and R(n,k) is the path transition matrix containing the value of j for which the maximum as expressed in equation)1) is realized.

After the modified MAP algorithm 14a has been applied onto the entire acoustic data set, the maximum of the cost function, $Y_{max}$, is then selected as follows:

$$Y_{max} = \text{Max}_{k=1,\ldots,K} Y(N_n) \quad (2)$$

and $k_{max}$ is set equal to the k index at which the maximum of $Y(N_k)$ occurs. Now, with $k_{max}$ determined, the MAP track is computed recursively using a path transition matrix, $R(n,k)$, as shown in equation (3):

$$T(n-1) = T(n) + R(n, T(n)) \quad (3)$$

for $n = N-1, \ldots, 1$, with $T(N)$ initialized to $k_{max}$.

Using the information provided by the MAP track, $T(n)$, namely the frequency bin as a function of time, the cumulative acoustic energy along this track is then determined according to equation (4):

$$E = \sum_{n=1}^{N} X(nT(n)) \quad (4)$$

where $X(nT(n))$ is the spectral bin amplitude of the $n^{th}$ time bin and $T(n)^{th}$ frequency bin.

This resulting integrated energy, E, corresponds to an observed measurement output from the Short and Toomey MAP algorithm 14a, which comprises a probabilistic transition mechanism, operating on the set of acoustic spectral data. Based on the value of E, which is a random variable by virtue of its corresponding random input, a decision is then made in regard to the state of the input acoustic data, i.e., whether the data contains signal plus noise, noise alone, or defer decision until next observation, which is the basis for the sequential detection 19 implemented in accordance with a second aspect of the present invention.

Derived below is a model for conditional (pdf) of E under a noise-only hypothesis. To simplify the problem, assume the transitional probabilities, $p(n_k | n-1_{k-j})$ for $j = -1, 0, 1$, in equation (1) are uniformly distributed, i.e., $p(n_k/n-1_{k-j}) = \frac{1}{3}$ for all j. With this assumption, the transition probability term in equation (1) is eliminated without affecting the final result of this algorithm. Moreover, the maximum cost function computed based on this modified expression has the same identical value as that of the integrated MAP track energy E in equation (4). Then, by determining the pdf of the maximum cost function $Y_{max}$ in terms of the transformed pdfs of the input spectral data $X(n_k)$ and the intermediate cost function $Y(n_k)$, the desired pdf of E results. Equation (1) can be written in a modified form.

$$Y(n_k) = X(n_k) + \max\{Y(n-1_{k-1}), Y(n-1_k), Y(n-1_{k+1})\} \quad (5).$$

In this equation, the spectral data and last time step cost functions on the right-hand side of equation (5) are random variables (rv). These rv's are transformed to yield another rv, $Y(n_k)$, the cost function for the current time step, through the mapping of an explicit single value function. Once the pdfs of functionally independent rv's (the right-hand side of equation (5)) are known, the dependent rv are easily determined using a conventional rv transformation technique, providing all of the functionally independent rv's are uncorrelated. Assume that the cost functions are uncorrelated under the noise-only condition; a discussion is presented below to justify this assumption. In regard to the other condition of being uncorrelated between the spectral data $X(n_k)$ and the cost function $Y(n-1_{k-j})$, this condition is realized if the spectral data is made independent of time bins as in a non-overlapping FFT.

Define $f_x(x)$ as the pdf for the spectral data, $X(n_k)$, for all n and k. Also define $f_{Yn}(Yn)$ as the pdf for the cost function for the time bin n and for all frequency bins k.

With the above stated probabilistic properties of these random values applied, the pdf of the cost function at the nth time bin $Y_n$ can be expressed in terms of the pdfs of the spectral data X, and cost function of the last time bin $Y_{n-1}$ as follows from the teachings of A. Papoulis cited above.

Let $Y = \max\{Y_{k-1}, Y_k, Y_{k+1}\}$.

If $Y_{k-1}, Y_k, Y_{k+1}$ are independent, then $$f_Y(Y) = f_{Y_{k-1}}(Y_{k-1}) F_{Y_k}(Y_k) F_{Y_{k+-1}}(Y_{k+1}) + F_{Y_{k-1}}(Y_{k-1}) f_{Y_k}(Y_k) F_{Y_{+-1}}(Y_{k+1}) + F_{Y_{k-1}}(Y_{k-1}) F_{Y_k}(Y_k) f_{Y_{k+-1}}(Y_{k+1}) \quad (6a).$$

From the above simplifying assumptions above, we have $$f_{Y_{k-1}}(Y_{k-1}) = f_{Y_k}(Y_k) = +f_{Y_{k+-1}}(Y_{k+1}) \quad (6b)$$

and $$F_{Y_{k-1}}(Y_{k-1}) = F_{Y_k}(Y_k) = +F_{Y_{k+-1}}(Y_{k+1}) \quad (6c)$$

and substituting (6b) into (6c) we get, $$f_Y(Y) = f_{Y_k}(Y_k) F_{Y_k}(Y_k) F_{Y_k}(Y_k) + F_{Y_k}(Y_k) F_{Y_k}(Y_k) F_{Y_k}(Y_k) + F_{Y_k}(Y_k) F_{Y_k}(Y_k) f_{Y_k}(Y_k)$$

and simplifying, $$f_Y(Y) = 3 F_{Y_k}^2(Y_k) f_{Y_k}(Y_k) \quad (6d).$$

If the rv's x and y are independent, then the density of their sum, $z = x + y$, equals the convolution of their respective densities [2]

$$f_z(z) = \int_{-\infty}^{\infty} f_x(z - y) f_y(y) dy = f_x(x) \oplus f_y(y) \quad (6e)$$

where X is the convolution operation. Combining (6d) and (6e), $$f_{Yn}(Y_n) = f_x(X) \times 3 F_{Y_{n-1}}^2(Y_{n-1}) f_{Y_{n-1}}(Y_{n-1}) \quad (6f)$$

where $F_{Y_{n-1}}(Y_{n-1})$ is the cumulative distribution function (cdf) of the rv $Y_{n-1}$.

If the expression in equation (6f) is exercised iteratively in time as in its corresponding MAP algorithm 14a in equation (5) with all of the assumptions in regard to the rv's probabilistic properties applied, i.e., all functionally independent rv's are uncorrelated, consistently throughout every single time step, this manner of computing the pdf of the rv $Y_n$ will lead to obtaining the pdf of $Y_{max}$ or E, the maximum cost function or the integrated MAP track energy. In fact, the pdf of $Y_{max}$ of E is indeed equal to the pdf of $Y_N$. No rigorous mathematical proof has been derived in supporting this claim. However, a heuristic argument is presented below to justify this.

Consider the maximum function in equation (5). This function achieves the maximum expected value if the functionally independent rv's are statistically uncorrelated. This conclusion can also be drawn indirectly from the other extreme condition of totally correlated rv's, in which case, the expected value of the maximum function is equal to the expected value of one of the rv's. This is because these rv's are statistically identical as implied by their total correlation, and the maximum of these rv's is therefore equal to one of the statistically identical rv's, i.e., $A = \max(B,C) = B$, if $B = C$.

Now apply the modified Short and Toomey MAP algorithm 14a to a set of noise-only acoustic data of adequate frequency width so that there exists in this data set a sufficiently large number of statistically independent acoustic data points on which the algorithm operates. Then the maximum cost function $Y_{max}$ or E corresponds to a time-frequency track which achieves the maximum attainable gain, i.e., the no correlation condition, on its cost function at every signal iteration in time. If that is the case, the pdf of $Y_{max}$ or E under a noise-only hypothesis $H_0, f_{E/H0}(E/H_0)$, can be determined iteratively in according to equation (6f) where all rv's are assumed to be statistically uncorrelated in each and every time recursive computation.

A derivation of a model for conditional pdf of E under a signal plus noise hypothesis is presented below. For the signal plus noise model development, the assumption of a statistically uncorrelated cost function embedded in the maximum function is no longer valid insofar as to determine the pdf of the integrated track energy. In fact, experiments have shown, that the contrary is true in which the values of the cost function are highly correlated among the frequency bins in the vicinity of the signal. This phenomenon can be explained by the intrinsic characteristics of the MAP algorithm 14a in which the values of the cost function associated with those frequency bins located adjacent to and along with the signal bin select, in computing their updates, with high probability the cost function emanating from the signal bin, thereby causing the spectral bins located about the signal to be highly correlated. For this reason, the noise model with its embedded uncorrelated spectral bin assumption can not be applied in the signal plus noise condition, and that necessitates a different modeling approach.

Consider the situation in which a set a acoustic data containing signal plus noise is input to the MAP algorithm 14a. The resulting MAP track faithfully follows the signal with as certain amount of deviations induced by tracing errors or frequency estimation errors. The amount of deviation or errors is a function of signal-to-noise ratio. Low SNR results in a higher probability of detracting the MAP track by sporadic noise energy away from the signal track, thereby giving rise to higher tracking errors. In the extreme low signal-to-noise ratio condition, the track may not be tracking the signal at all but may be merely following some unrelated noise samples. In the high signal-to-noise ratio situation, however, where the signal bin amplitudes are consistently and significantly higher than those of the neighboring noise bins, the MAP track coincides with the signal track exactly. For now, attention is focussed only on the cases involving moderate to high signal-to-noise ratios where the fundamental tenets of the signal plus noise model is considered to be valid, and the low SNR cases are addressed later on. Then, based on the MAP algorithm 14a search path of three bins as specified by the range of values of index j in equation (1) and the above discussion, the MAP track deviates from the actual signal track at most by plus or minus one bin for the range of signal-to-noise ratio values under consideration. Consequently, the MAP algorithm 14a always selects, in obtaining its MAP track solution, the largest of the three frequency bins centered around the signal at each time step as the track propagates forward. If this describes the actual computational mechanics of the MAP algorithm 14a, then the integrated track energy may be obtained by summing in time the maximum bin amplitude among the three bins centered around the signal as shown in equation (7).

$$E = Y_{max} = \sum_{n=1}^{N} \max\{X(n_{s-1}), X(n_s), X(n_{s+1})\} = \sum_{n=1}^{N} Z_n \quad (7)$$

where $X(ns)$ is the magnitude of the spectral bin containing the signal at time bin n, and $Z_n = \max\{X(n_{s-1}), X(n_s), X(n_{s+1})\}$.

For the uncorrelated signal and noise condition, and the uncorrelated time samples as in non-overlapped FFT processing, the pdf of E under the signal presence hypothesis $H_1, f_{E/H1}(E/H_1)$, is obtained in according to equation (8).

$$f_{E|H1}(E|H_1) = F_{z1}(z_1) \times F_{z2}(z_2) \times \ldots \times F_{zn}(z_n) \quad (8)$$

where $$f_{Zn}(Z_n) = F_{X_{n,s-1}}(X_{n,s-1})F_{n,s+1}(X_{n,s+1})F_{X_{n,s}}(X_{n,s})$$
$$+ F_{X_{n,s-1}}(X_{n,s-1})F_{X_{n,s}}(X_{n,s})F_{X_{n,s+1}}(X_{n,s+1}) +$$
$$F_{X_{n,s+1}}(X_{n,s+1})F_{n,s}(X_{n,s})F_{X_{n,s-1}}(X_{n,s-1}) \quad (9)$$

and where $f_{X_{n,s}}(X_{n,s})$ and $F_{X_{n,s}}(X_{n,s})$ equal the pdf and cdf of $X(n_s)$, respectively.

Furthermore, if all signal plus noise and noise spectral bins are independent and identical, in their respective categories, rv's in time, the pdf of E under signal plus noise condition is a Gaussian rv with the following first and second order statistics, and is given by $$f_{E|H1}(EH_1) = \eta[NE\{Z\}, Var\{Z\}] \quad (10),$$

where $\eta(\mu, \sigma^2)$ is the Gaussian pdf of $\mu$ mean and $\sigma^2$ variance, $E\{Z\}$ is the expectation of the rv Z, $Var\{Z\}$ is the variance of the rv Z, and $Z = Zn$ for all $n = 1, \ldots, 1$.

Although the derivation of the signal model for generating the pdf of E is accomplished without the benefit of traditional mathematical rigor, the model reflects consistently and accurately, at least in moderate to high signal-to-noise ratios, the underlying mathematical behavior of the MAP algorithm 14a in process of signal plus noise data. This conclusion may be explained intuitively by examining the functional characteristics of the model. It may be observed in equation (7) that as the signal-to-noise ratio increases, the signal bin increases its dominance over the noise bins inside the maximum function thereby producing better and better estimates. Toward the limit of infinite signal-to-noise ratio, the MAP track tracks precisely the signal with probability one.

It should be noted that two discrete models have been developed and are used in modeling a physical phenomenon that usually occurs in continuum when transitions from one state (noise-only) to another state (signal-plus-noise). It is inconceivable that these two models are individually in full discrete complement for the entire range of signal-to-noise ratio values $(-\infty$ to $\infty)$ such that the signal plus noise model by itself as expressed in equation (9) is sufficient in describing the entire range of signal plus noise condition, including the low signal-to-noise ratio region.

To account for this noise track contribution in a manner that is consistent with the MAP algorithmic behavior, equation (9) is expanded to reflect the actual maximum selection between the population of low SNR tracks and the population noise tracks as follows:

$$E = \max\{E|H_0, E|H_1\} \tag{11}$$

$$f_{E|H_0}(E|H_1) = f_{E|H_1}(EH_1)f_{E|H_0}(E|H_0) + f_{E|H_0}(E|H_0)f_{E|H_1}(E|H_1) \tag{12}$$

where $f_{EH_0}(EH_0)$, $f_{EH_1}(EH_1)$ are the cdf's of E under $H_0$ and $H_1$, respectively.

APPENDIX C

A detailed testing procedure for the sequential signal detection process 18 has been described by Wald in "Sequential Analysis", New York: Wiley, 1947, and is summarized below for the present application. For the $i^{th}$ MAP time segment, a sample log-likelihood (LLR), $r_i$, is computed in according to equation (13) based on the value of the integrated MAP track $E_i$.

$$r_1 = \ln\left[\frac{f_{E_1|H_1}(e_1|H_1)}{f_{E_0|H_0}(e_1|H_1)}\right], \text{ for } i = 1,\ldots,i \tag{13}$$

Since the conditional pdf's of the two hypotheses have been determined earlier to be both Gaussian but of different means and variances, equation (13) can be expanded to the expression as shown in equation (14) with the proper substitutions of the pdf's and mathematical manipulations.

$$r_1 = \tag{14}$$

$$\frac{(\theta_1 - \mu_1)^2}{2\sigma_1^2} + \frac{(\theta_1 - \mu_0)^2}{2\sigma_0^2} - \ln\left(\frac{\sigma_1}{\sigma_0}\right), \text{ for } i = 1,\ldots,i$$

where, $\mu_1, \sigma_1^2$ are the mean and variance of the conditional pdf of $E_1$ and $H_1$, and $\mu_0, \sigma_0^2$ are the mean and variance of the conditional pdf of $E_0$ and $H_0$.

The value of the computed ith time segment LLR, $r_i$, is added to a running sum $R_i$, which represents the log-likelihood-ratio of the joint conditional pdf's of the entire sample set. The resulting LLR, $R_i$, is then compared with two threshold values, ln(A) and ln(B), (A>B), which are defined as follows.

$$A = \frac{pd}{pfa} \tag{15}$$

$$B = \frac{(1-pd)}{(1-pfa)} \tag{16}$$

If $R_i$ is exceeding the threshold value ln(A), a detection of a signal is declared. On the other hand, if the running sum is receding below the threshold value ln(B), the signal track is declared to be a noise track. Upon making anyone of these two decisions, the sequential detection terminates. However, if the LLR, $R_i$, falls between the two threshold values, no decision is made and the detect procedure repeats with the next time segment's input. This sequential detection procedure can also be expressed mathematically as follows.

$$R_i = (r_1 + r_2 + \ldots + r_i)/i \begin{cases} \leq \ln(\beta), \text{decide} H_0\text{-noise track} \\ \geq \ln(\alpha), \text{decide} H_1\text{-signal track} \\ \text{otherwise, no decision-repeat} \\ \text{procedure} \end{cases} \tag{17}$$

In applying this sequential decision procedure, it has been suggested that the average size of the increments $r_i$ of the LLR R be set much smaller than ln(A/B) in order to be consistent with the approximations made leading to equations (15) and (16). This requirement means the average number of time segments required in the sequential test be very large and the signal-to-noise ratio for the standard signal be very small.

APPENDIX D

A mathematical description of the sequential signal detection process 18 is presented below. In a traditional constant false alarm detector, once the threshold value is fixed to yield a desired pfa, the value of pd for a given signal-to-noise ratio is also implicitly determined because there are only two decision between which the threshold partitions. For sequential signal detection process 18, there is a third decision, which is the deferred decision awaiting to be resolved in the next observation. The present detector makes use of these inherent characteristics of the two detectors, but in a modified form such that for every observation when no affirmative decision was made in the previous cycle, the detection threshold is recomputed based on the joint conditional pdf's formed by the accumulated observation as in a multiple observation detector to yield the desired pd for an explicitly specified pfa. In the present sequential detector, the conditional pdf's and the MAP track integrated energy E, are Gaussian-like, and using the well-known Gaussian property that the sum of Gaussian functions is also Gaussian to form the conditional pdf's for the accumulated multiple observations are formed. To state this mathematically, define the test statistic for this detector as the average of accumulated of E as shown in equation (18).

$$L_i = (e_1 + e_2 + \ldots + e_i)/i \begin{cases} \leq \ln(\beta), \text{decide} H_0\text{-noise track} \\ \geq \ln(\alpha), \text{decide} H_1\text{-signal track} \\ \text{otherwise, no decision-repeat} \\ \text{procedure} \end{cases} \tag{18}$$

where $e_i$ is the actual measured value of E at the MAP time segment.

Because the aforementioned Gaussian property, the conditional pdf's of $L_i$, the test statistic can be readily obtained as follows.

$$f_{L_1|H_1}(1|H_1) = \eta[\text{Mean}\{E|H_1\}, \text{Var}\{E|H_1\}]/i] = \eta(\mu_1, \sigma_1^2/i) \tag{19a}$$

and $$f_{L_1|H_0}(1|H_0) = \eta[\text{Mean}\{E|H_0\}, \text{Var}\{E|H_0\}]/i] = \eta(\mu_0, \sigma_0^2/i) \tag{19b}$$

Then, for a given pfa value of pfa, the threshold $\beta$ with the test statistic $L_i$, is compared for signal absence ($H_0$) decision can be determined as indicated in equation (20).

$$\beta = \left(\frac{\sigma_0}{\sqrt{i}}\right) erf^{-1}(1 - P_{pfa}) + \mu_0 \quad (20)$$

where, $erf^{-1}$ is the inverse error function, and the error function is defined as follows:

$$erf(x) = \frac{1}{2\pi} \int_0^x \exp(-y^2/2)dy \quad (21)$$

Similarly, for a specified pd value of $p_{pd}$, the threshold with which the test statistic $L_i$ is compared for the signal presence ($H_1$) decision may be determined as shown in equation (22).

$$\alpha = \left(\frac{\sigma_1}{\sqrt{i}}\right) erf^{-1}(1 - P_{pd}) + \mu_1 \quad (22)$$

For the value of a test statistic which falls between these two thresholds, the decision is deferred until the next updated as it is specified in equation (18). Since the derivation of this detector is exact without relying on mathematical approximation, the solutions in equation (20) and (22) are valid for any number of observations. Furthermore, there is no low signal-to-noise ratio restriction on this detector as such that a moderate signal-to-noise ratio value may be selected as the standard signal in order to achieve the required fast detection time and the thresholds can be precisely controlled for every observation interval to obtain the desired pd and pfa.

APPENDIX E

```
Y(t,f) = X(t,f) + Max {Y(t-1, f+n.p) + log[P(np)]}, p1≤np≤p2
Y(t,f) : MAP cost function at time bin t and frequency bin f.
X(t,f) : spectral bin amplitude magnitude at time bin t and
frequency bin f.
P(np) : transition probability from frequency bin f+p1 to f+p2.
TRK(t) : Frequency track of signal as function of time.
T: time segment length in bins.
F: frequency width in bins.
X(t,f) : spectral bin amplitude magnitude at time bin t and
frequency bin f.
TRK(t) : Frequency track of signal as function of time.
ALI(-ALI_WIDTH:ALI_WIDTH)
L0 = 0
i = 0
loop over time segments unit signal or noise is detected
do while signal_condition_flag = -1
i = i+1
Short & Toomey pseudo code
Initialize frequency bin for time bin = 1.
   for f = 1,F
        temp2(f) = X(1,f)
   endfor
save old cost vector
   for f = 2,T
      for f=1,F
          temp1(f) = temp2(f)
      endfor
      for f=1,F
initialize index array to zero, max to largest negative number
          y(t-1, f) = 0
          max=MAX_NEG
loop through transitional probabilities
          for np= -NP,NP
```

APPENDIX E -continued

```
compute index
              index = f + np
check bounds
              if( (index >= 1) .and. (index <= F)) then
form temporary cost vector
                  temp2(f) = temp1(index) + P(np)
test cost vector against max
                  if( temp2(f) > max) then
update max
                      max = temp2(f)
update index
                      y(t-1, f) = np
                  endif
              endif
          endfor
construct new cost vector
              temp2(f) = max + x(t,f)
          endfor
      endfor
initialize max to largest negative number
      max=MAX_NEG
      for f=1, F
test for global minimum
          if( temp2(f) > max) then
              imax = f
              max = temp2(f)
          endif
      endfor
initialize track to global max bin
      TRK(T) = imax
decrement through time
      for t = T, 2, -1
form track from index array
          TRK(t-1) = TRK(t) + y( TRK(t), t-1)
      endfor
          compute track energy to be used for sequential
          detection logic
      for ali = -ALI_WIDTH, ALI_WIDTH E = Σ_{t=1}^{T} X(t,ali + TRK(t))

end
   L_i = L_{i-1} + E/i
   β_i = β_0/sqrt(i)
   oe_i = oe_0/sqrt(i)
   if L_i ≤ ln( β_i ) then signal_condition_flag = 0
      else if L_i ≥ ln( oe_i ) then signal_condition_flag = 1
      else signal_condition_flag = -1
      endif
end while loop.
```

What is claimed is:

1. A signal processing method for passively tracking moving targets comprising the steps of:
    storing received data signals indicative the frequency and time of arrival of moving targets to provide stored data signals;
    processing the stored data signals using a processing window comprising a first time frame having a predetermined frequency extent and time extent to process a predetermined subset of the stored data signals;
    partitioning the processing window into a plurality of subwindows;
    selecting a subwindow and detecting a strongest line of signals within the subwindow using a maximum a posteriori procedure;
    integrating and removing the strongest line of signals detected in the subwindow;
    repeating the last two steps until all lines have been detected and removed from the selected subwindow; and repeating the last three steps until all subwindows have been processed;

associating based on line characteristics the detected lines of the current time segment to line tracks that have already been either detected as targets or maintained as potential targets;

comparing lines that have not been declared as targets with continuously adjusted thresholds to determine whether they should be maintained as potential targets or be purged as noise tracks;

signalling an operator of the presence of a target having predetermined operator-defined characteristics, whereupon the moving targets are passively tracked and the operator is notified of potential targets.

2. The method of claim 1 wherein the step of integrating and removing the strongest line of signals comprises the steps of:

computing a noise-only statistic for each subwindow that defines processed tracks that are considered to be noise; and setting a lower threshold value with reference to the noise-only statistic to achieve a predetermined false alarm rate.

3. The method of claim 2 which further comprises the step of:

sequentially moving the lower threshold value to a lower value in order to maintain a constant false alarm rate while detecting the signals.

4. The method of claim 1 which further comprises the step of:

processing received data signals comprising a second time frame in accordance with the processing steps of claim 1; and linking the signal lines detected in the first time frame with the signals detected in the second time frame in order to detect a target based upon the integrated value of the signal line formed from the first and second time frames.

5. The method of claim 2 which further comprises the step of:

sequentially moving the lower threshold value to a lower value in order to maintain a constant false alarm rate while detecting the signals.

6. Signal processing apparatus for passively tracking moving targets comprising:

memory means for storing received data signals indicative the frequency and time of arrival of moving targets to provide stored data signals;

computational means comprising:

means for processing the stored data signals using a processing window comprising a first time frame having a predetermined frequency extent and time extent to process a predetermined subset of the stored data signals, means for partitioning the processing window into a plurality of subwindows, means for selecting a subwindow and detecting the strongest line of signals within the subwindow using a maximum a posteriori procedure, and means for integrating and removing the strongest line of signals detected in the subwindow;

means for signalling an operator of the presence of a target having predetermined operator-defined characteristics;

whereupon the moving targets are passively tracked and the operator is notified of potential targets.

7. The apparatus of claim 6 wherein the means for integrating and removing the strongest line of signals comprises:

means for computing a noise-only statistic for each subwindow that defines processed signals that are considered to be noise; and means for setting a lower threshold value with reference to the noise-only statistic to achieve a predetermined false alarm rate.

8. The apparatus of claim 7 which further comprises:

means for sequentially moving the lower threshold value to a lower value in order to maintain a constant false alarm rate while detecting the signals.

9. The apparatus of claim 6 which further comprises:

means for processing received data signals comprising a second time frame in accordance with the processing steps of claim 1; and means for linking the signal lines detected in the first time frame with the signals detected in the second time frame in order to detect a target based upon the integrated value of the signal line formed from the first and second time frames.

10. The apparatus of claim 9 wherein the means for integrating and removing the strongest line of signals comprises:

means for computing a noise-only statistic for each subwindow that defines processed signals that are considered to be noise; and means for setting a lower threshold value with reference to the noise-only statistic to achieve a predetermined false alarm rate.

11. The apparatus of claim 8 which further comprises:

means for sequentially moving the lower threshold value to a lower value in order to maintain a constant false alarm rate while detecting the signals.

* * * * *